United States Patent

Werbus

[11] Patent Number: 6,018,672
[45] Date of Patent: Jan. 25, 2000

[54] ARRANGEMENT FOR OPERATING A MOBILE TERMINAL IN A WIRELESS SWITCHING SYSTEM BASED ON DIFFERENT COMMUNICATION STANDARDS

[75] Inventor: Volker Werbus, Gilching, Germany

[73] Assignee: Alcatel Alsthom Compagnie Generale d'Electricite, Paris, France

[21] Appl. No.: 08/850,241

[22] Filed: May 2, 1997

[30] Foreign Application Priority Data

May 7, 1996 [DE] Germany .................... 196 18 243

[51] Int. Cl.⁷ ........................................... H04Q 7/20
[52] U.S. Cl. ..................... 455/575; 455/552; 455/557
[58] Field of Search ................................ 455/552, 553, 455/575, 349, 462, 74, 74.1, 557

[56] References Cited

U.S. PATENT DOCUMENTS

| | | | |
|---|---|---|---|
| 4,876,710 | 10/1989 | Reed et al. ................................. | 379/63 |
| 5,241,410 | 8/1993 | Streck et al. ............................... | 455/40 |
| 5,442,680 | 8/1995 | Shellinger et al. .................. | 455/552 X |
| 5,535,274 | 7/1996 | Braitberg ................................. | 379/446 |
| 5,636,264 | 6/1997 | Sulavuori et al. ....................... | 379/56 |
| 5,659,598 | 8/1997 | Byrne et al. ......................... | 455/553 X |
| 5,737,703 | 4/1998 | Byrne ..................................... | 455/442 |
| 5,774,805 | 6/1998 | Zicker ................................. | 455/552 X |

FOREIGN PATENT DOCUMENTS

| | | |
|---|---|---|
| 0585030 | 3/1994 | European Pat. Off. . |
| 0700227 | 8/1995 | European Pat. Off. . |
| 2241850 | 9/1991 | United Kingdom . |
| 9523485 | 8/1995 | WIPO . |

*Primary Examiner*—Wellington Chin
*Assistant Examiner*—Yemaue Woldetatios

[57] ABSTRACT

To be able to utilize the advantages of a cordless system based on the DECT standard as well as the advantages of a cellular mobile radio system based on the GSM standard, dual-mode units are known which switch automatically to the lower cost standard. The expense of such units and of the necessary additional circuits in the network infrastructure is avoided when the mobile unit and a mobile unit adapter are equipped with an infrared interface, whereby all the necessary information for the man-machine communication are transmitted independently of the standards. In this way it is possible to access the GSM mobile radio network without engaging the network infrastructure, for example with a DECT mobile unit via a GSM mobile unit adapter. The infrared interface circuit, which essentially comprises an infrared transceiver (1.1, 2.1), a codec (1.3, 2.3) and a digital signal processor (1.2, 2.2), transmits the speech or potentially data as well, the content of the display read-out and the information via respectively activated keys.

6 Claims, 1 Drawing Sheet

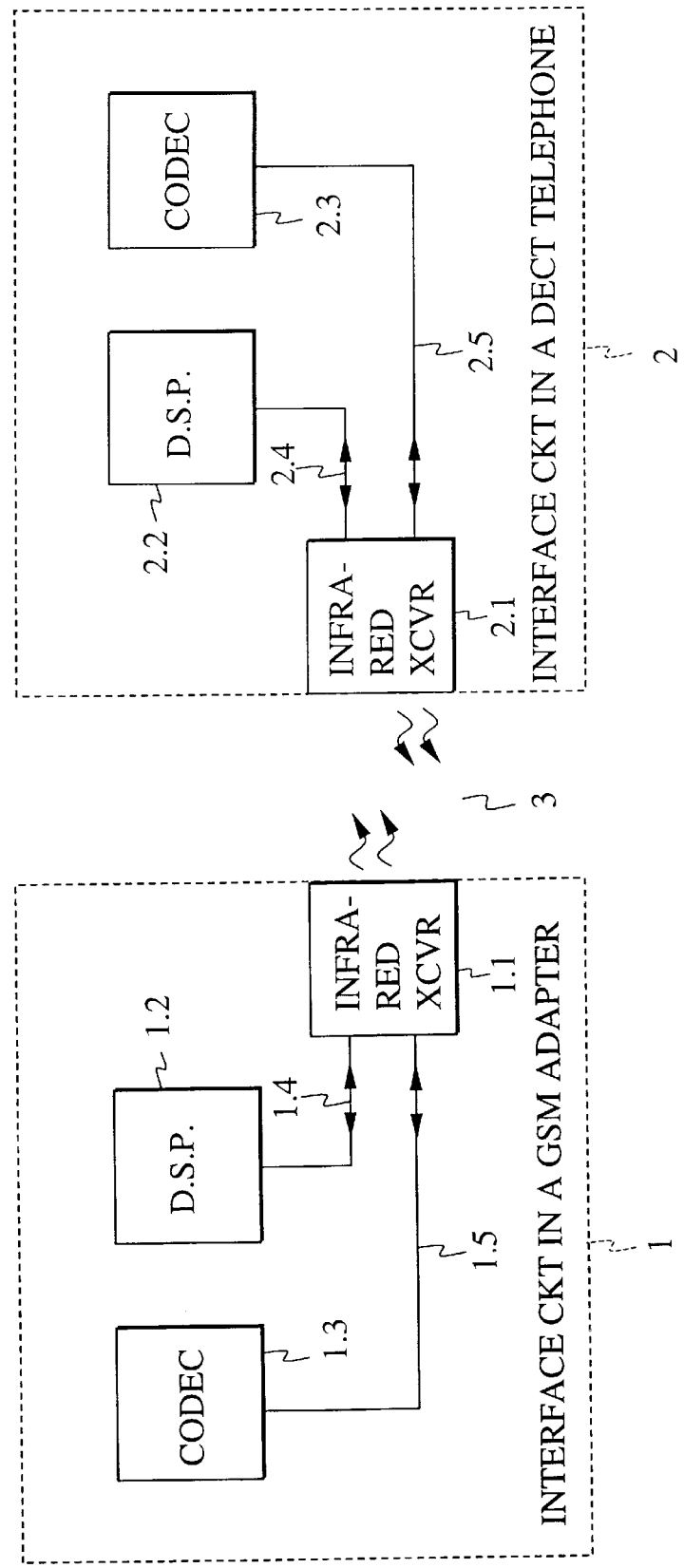

ARRANGEMENT FOR OPERATING A MOBILE TERMINAL IN A WIRELESS SWITCHING SYSTEM BASED ON DIFFERENT COMMUNICATION STANDARDS

BACKGROUND OF THE INVENTION

1. Field of the Invention

The invention concerns an arrangement for operating a mobile terminal, for example selectively via a cordless system in a fixed network based on the DECT (Digital European Cordless Telecommunications) standard, or via a cellular mobile radio system based on the GSM (Global System for Mobile Communication) standard.

2. Discussion of Related Art

To an increasing degree many subscribers need to be able to telephone regardless of their location, both in a limited company district which is serviced by a cordless system, as well as from a car. Within the company district a subscriber usually uses a cordless telephone which is based on the DECT standard, and in the car a car telephone which is based on the GSM standard. To avoid using two different telephone devices, it is known to use a dual-mode hand set which can transmit and receive DECT as well as GSM signals, see DE 43 44 702 A1. Radio contact with the DECT system is preferred in this case because the DECT system has a technically better speech quality than the GSM system. Although a realization of the dual-mode hand set is possible, it takes a considerable effort however to adapt the different determinations of the standards to each other, such as for example speech encoding, keying, handover procedure and authentication of the mobile terminal. To comply with this requirement it is known to assign a so-called interworking unit to each DECT control station, see "Radio Show" brochure 3, 1996, page 24, Franzis Publishers GmbH, Feldkirchen.

SUMMARY OF THE INVENTION

The invention now fulfills the task of presenting a cost-effective arrangement whereby a mobile terminal can be used in cordless systems or in cellular mobile radio systems without the need to engage the network infrastructure.

According to the present invention, an arrangement for operating a mobile unit in a wireless switching system, the mobile unit and the wireless switching system based on different communication standards, is characterized in that the mobile unit and a mobile-unit adapter which has access to the wireless switching system each include an interface circuit via which standard-independent information is exchanged, so that the mobile unit, which is based on a given communication standard, is made usable in a wireless switching system which is based on a different communication standard.

The nature of the invention is that all the necessary data for a man-machine communication are transmitted via an interface between the mobile terminal and a stationary module, which can access the cordless system or the cellular mobile radio system. In the case of a telephone this is the speech, the content of the display read-out and information regarding the respectively activated key.

These and other objects, features and advantages of the present invention will become more apparent in light of the detailed description of a best mode embodiment thereof, as illustrated in the accompanying drawing.

BRIEF DESCRIPTION OF THE DRAWING

The sole FIGURE illustrates an interface arrangement between a GSM unit and a DECT unit.

DETAILED DESCRIPTION OF THE PREFERRED EMBODIMENTS

The operating mode of the invention is explained in the following by means of a configuration example. As mentioned, the pertinent drawing illustrates a figure with an interface arrangement between a GSM unit and a DECT unit.

A first application case describes the access of a cordless telephone based on the DECT standard, briefly called DECT telephone, to the GSM network.

To that end an adapter for a GSM telephone, which is permanently installed in the vehicle, is equipped with an infrared interface circuit for example. The DECT telephone is also equipped with an infrared interface circuit, so that the DECT telephone has designated access to the DECT network as well as to the GSM network via the infrared interface. In the present case the GSM telephone can thus be omitted.

In a second application case the GSM telephone and a DECT base station are each equipped with an infrared interface circuit. In this case it is possible to engage the DECT network by means of a GSM telephone.

According to the figure, the interface arrangement comprises an interface circuit 1 in a GSM adapter and an interface circuit 2 in a DECT telephone. The figure only illustrates the modules which are essential to explain the invention. The interface circuits 1, 2 establish a duplex-capable link via an infrared path 3. Each interface circuit 1, 2 essentially comprises an infrared transceiver 1.1, 2.1, a digital signal processor 1.2, 2.2 and a codec 1.3, 2.3.

When a subscriber wishes to establish a connection with the DECT unit via the GSM network, the transmitter of the infrared transceiver 2.1 must first be activated. This takes place by either activating a key in the DECT unit, or automatically by sequentially polling the interface arrangement as to whether any information is available for transmission. The selection information and the instructions generated by the keyboard of the DECT unit are routed as prepared data by the digital signal processor 2.2 via a bidirectional data line 2.4, the infrared transceiver 2.1 and the infrared path 3 to the transceiver 1.1 of the GSM unit, from where a bidirectional data line 1.4 leads to the digital signal processor 1.2 of the GSM unit, which further processes the selection information and the instructions of the DECT unit as if they had originated in a GSM telephone. After the connection has been established, the speech or for example via facsimile transmission the data, are transmitted in PCM or ADPCM format from the DECT unit via the codec 2.3, and via a bidirectional line 2.5 to the transceiver 2.1, and from there via the infrared path 3 to the transceiver 1.1, and via a bidirectional line 1.5 to the codec 1.3 of the GSM unit.

The simple and therefore cost-effective interface arrangement makes it possible for the subscriber, depending on his location, to selectively use the GSM network or the DECT network by means of only one terminal, thereby utilizing the advantages of different tariff structures. The ability to reach the subscriber is assured by utilizing known network output features such as call forwarding if the subscriber does not answer, so that the subscriber can always be reached with one telephone number. The infrared interface proved to be especially advantageous since no interference takes place in the respective radio unit and the cost of infrared interface components is low. But it is also possible to utilize already existing interfaces for the described purpose, for example for data transmission via GSM units. In that case a cable connection between the GSM unit and the DECT unit would be required. The interface arrangement of the invention is much less expensive than the known dual-mode units. The simple circuit structure makes it possible to equip designer units with the interface arrangement, or to expand units which are already in operation by means of the interface arrangement.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. An arrangement for operating a mobile unit in a wireless switching system, the mobile unit and the wireless switching system based on different communication standards, characterized in that the mobile unit and a mobile-unit adapter which has access to the wireless switching system each include an interface circuit via which standard-independent information is exchanged, so that the mobile unit, which is based on a given communication standard, is made usable on a different communication standard, that the mobile unit is based on the DECT standard, and that the mobile-unit adapter belongs to a wireless switching system based on the GSM standard.

2. An arrangement as claimed in claim 1, characterized in that the information exchange between the interface circuit takes place via an infrared link.

3. An arrangement for operating a mobile unit in a wireless switching system, the mobile unit and the wireless switching system based on different communication standards, characterized in that the mobile unit and the mobile unit adapter which has access to the wireless switching system each include an interface circuit via which standard-independent information is exchanged, so that the mobile unit, which is based on a given communication standard, it made usable in a wireless switching system which is based on a different communication standard, that the mobile unit is based on the GSM standard, and that the mobile-unit adapter belongs to a wireless switching system based on the DECT standard.

4. An arrangement as claimed in claim 3, characterized in that the information exchange between the interface circuit takes place via an infrared link.

5. An arrangement for operating a mobile unit in a wireless switching system, the mobile unit and the wireless switching system based on different communication standards, characterized in that the mobile unit and a mobile-unit adapter which has access to the wireless switching system each include an interface circuit via which standard-independent information is exchanged, so that the mobile unit, which is based on a given communication standard, is made usable in a wireless switching system which is based on a different communication standard, that the interface circuit comprises an infrared transceiver (1.1, 2.1) preceded by a codec (1.3, 2.3) and a digital signal processor (1.2, 2.2).

6. An arrangement as claimed in claim 5, characterized in that speech or data is transmitted via the codec (1.3, 2.3) bidirectionally and independently of wireless communication standards, and that the exchange of information and instructions generated by the keyboard of the mobile unit takes place via the digital signal processor (1.2, 2.2) and the infrared transceiver (1.1, 2.1) independently of wireless communication standards.

\* \* \* \* \*

UNITED STATES PATENT AND TRADEMARK OFFICE
CERTIFICATE OF CORRRECTION

PATENT NO. : 6,018,672
DATED : January 25, 2000
INVENTOR(S) : Volker Werbus It is certified that error appears in the above-identified patent and that said Letters Patent is hereby corrected as shown below:

Title page, item [56] References Cited, insert the following:

FOREIGN PATENT OR PUBLISHED FOREIGN PATENT APPLICATION

| | | | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | DOCUMENT NUMBER | | | | | | | | YES | NO |
| | | | 4 | 3 | 1 | 5 | 6 | 2 | 1 | 11/94 | Germany | | | |
| | 1 | 9 | 6 | 0 | 2 | 4 | 4 | 9 | 8/96 | Germany | | | |
| | | | 4 | 4 | 2 | 7 | 0 | 4 | 1 | 2/96 | Germany | | | |
| | 1 | 9 | 5 | 0 | 2 | 6 | 4 | 1 | 7/96 | Germany | | | |
| | | | 4 | 4 | 0 | 0 | 8 | 3 | 2 | 7/95 | Germany | | | |
| | | | 4 | 2 | 4 | 4 | 4 | 6 | 8 | 7/94 | Germany | | | |
| | | | 0 | 7 | 0 | 0 | 2 | 2 | 7 | 8/95 | EPO | | | |
| | | | 4 | 3 | 4 | 4 | 7 | 0 | 2 | 7/95 | Germany | | | |

OTHER PRIOR ART (Including Author, Title, Date, Pertinent Pages, Etc.)

Funkschau, Vol. 3, 1996, p. 24, "Technische Realisierung".

Signed and Sealed this

Sixth Day of June, 2000

*Attest:*

Q. TODD DICKINSON

*Attesting Officer*   *Director of Patents and Trademarks*